United States Patent [19]

Zimmer

[11] Patent Number: 5,281,064
[45] Date of Patent: Jan. 25, 1994

[54] PANEL MOUNT HARDWARE ASSEMBLY FOR FRONT AND REAR MOUNTING

[75] Inventor: Kenneth J. Zimmer, New Brunswick, N.J.

[73] Assignee: Standard Keil Industries, Inc., Allenwood, N.J.

[21] Appl. No.: 6,258

[22] Filed: Jan. 19, 1993

[51] Int. Cl.$^5$ .................. F16B 27/00; F16B 37/04; F16B 39/00
[52] U.S. Cl. .................. 411/85; 411/107; 411/182; 411/999; 403/408.1
[58] Field of Search .................. 411/84, 85, 107, 108, 411/104, 112, 113, 182, 970, 999; 403/408.1

[56] References Cited

U.S. PATENT DOCUMENTS

| | | | |
|---|---|---|---|
| 2,717,622 | 9/1955 | Flora | 411/112 |
| 3,035,624 | 5/1962 | Jaworski | 411/112 |
| 3,138,187 | 6/1964 | Jaworski | 411/112 |
| 3,314,465 | 4/1967 | Bien | 411/112 |
| 3,878,042 | 4/1975 | Curulla et al. | 411/999 X |
| 4,666,355 | 5/1987 | Stover | 411/85 |
| 5,067,863 | 11/1991 | Kowalski | 411/85 |

*Primary Examiner*—Neill R. Wilson
*Attorney, Agent, or Firm*—Schweitzer Cornman & Gross

[57] ABSTRACT

A fastening system allows the panel mounting of handles and similar hardware in both front and rear mount configurations. A caged bolt is provided in a transverse aperture extending through the hardware item. A mounting bolt includes a head-distal shank portion for engagement with the bolt when inserted through the hardware rear face, and head-proximate unthreaded shank portion for capture by the caged nut when the bolt is inserted through the hardware item from the front face. The caged nut can be positioned along the length of the aperture to align with a panel mounting hole.

5 Claims, 3 Drawing Sheets

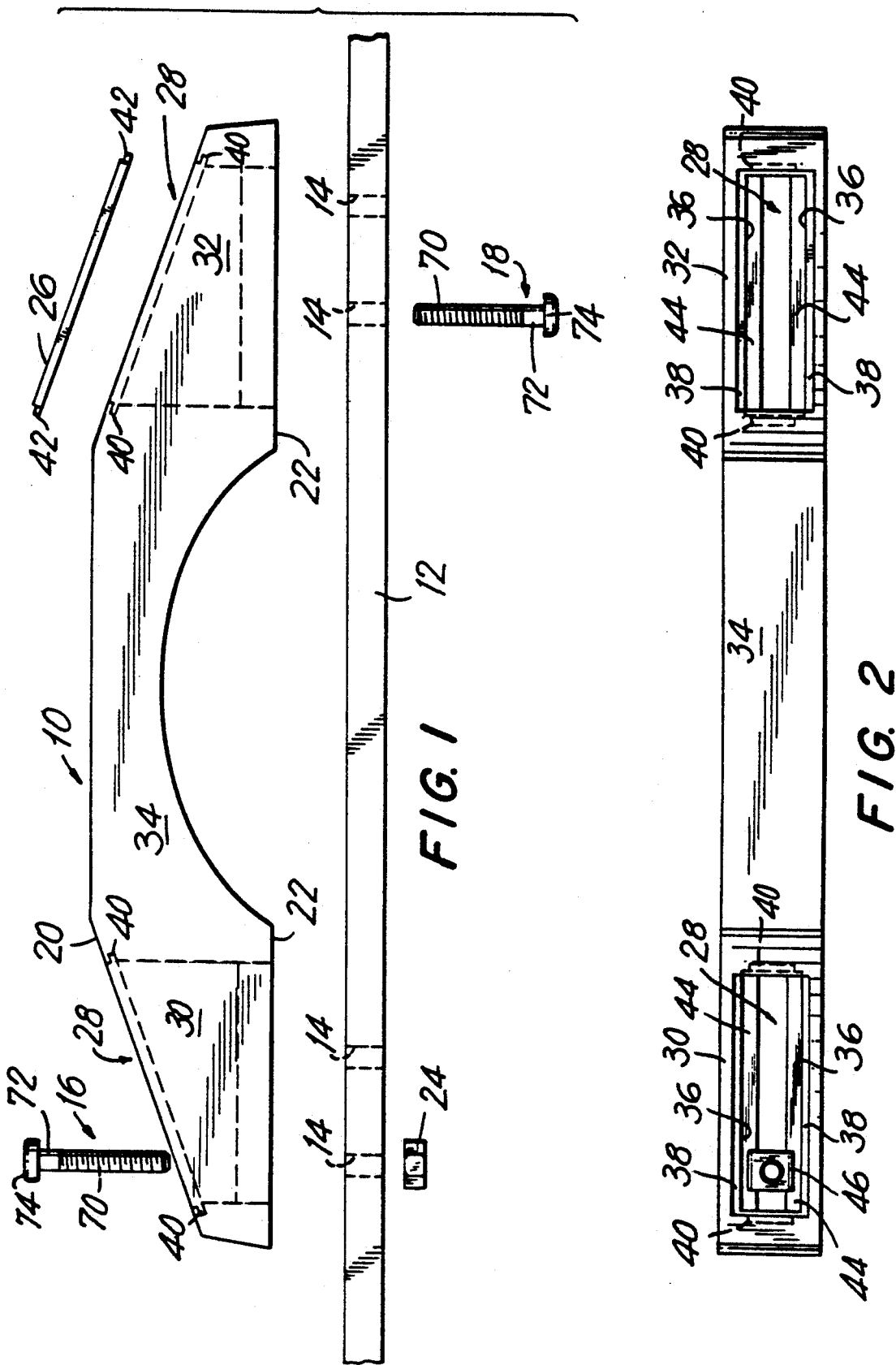

PANEL MOUNT HARDWARE ASSEMBLY FOR FRONT AND REAR MOUNTING

The present invention relates to the mechanical arts and, in particular, to a fastening system for the mounting of handles and similar hardware to a backing panel.

BACKGROUND OF THE INVENTION

There exist two generally recognized methodologies for the mounting of handles and similar hardware to panels, doors and the like. A first system, which is designated as a front mount system, utilizes a handle or other item to be mounted having a transverse bore extending through the item between its front and rear faces. The bore is sized to accept and retain the head of a bolt, which is inserted through the front face, and extends through the back surface of the handle and through the mounting panel. A mating nut, applied to the bolt behind the mounting surface, affixes the handle to the mounting surface. Alternatively, the panel may be threaded or provided with an applied threaded plate on its rear surface to engage the bolt. A cover may be utilized to mask the bolt head from view from the front of the handle.

In the second known system, a blind bore is provided in the rear face of the handle. A nut is mounted within the bore, and restrained from rotation. A mounting bolt is inserted through the mounting panel from the rear thereof, and passes into the handle through its rear face to engage the nut. The length of the bolt is chosen such that the handle may be snugged up against the panel without the bolt contacting the bottom of the handle bore.

The front mount system is typically utilized when space behind the mounting panel is limited. It has the disadvantage, however, of often requiring both a tool to drive the bolt and a tool to retain the nut in position during tightening. The rear mount system, on the other hand, does not require a pair of tools, but requires sufficient space behind the mounting panel to manipulate the bolt for insertion into the bore. Both systems require precise alignment of the handle bores and panel mounting holes.

Because of the general uninterchangeability of the elements required for front and rear mounting, it has heretofore necessitated that two separate classes of hardware be employed for mounting purposes, depending on the type of mount required. Thus, extra inventory is required, with the possibility for mixup.

It is accordingly a purpose of the present invention to provide a mounting system for handles and the like which may be utilized in both front and rear mount environments.

A further purpose of the present invention is to provide a mounting system having a single set of components which are used in both front and rear mount systems.

Still another purpose of the present invention is to provide a combination front and rear mount system which facilitates installation of handles and the like in either manner.

Yet another purpose of the present invention is to provide a mounting system which allows a single handle to accommodate the panel holes having a wide range of center-to-center spacings.

BRIEF DESCRIPTION OF THE INVENTION

In accordance with the above and other features and purposes of the invention, the mounting system of the present invention comprises a handle or similar item of hardware to be mounted having a transverse slot extending between the front and rear faces in which a captured nut is mounted. The nut may be positionable laterally in the slot to allow alignment with a mounting hole in the panel to which the handle is to be applied. A bolt having a head size compatible with the slot width is provided, the shank of the bolt having a distal threaded section mateable with the bolt and a proximal unthreaded section of a reduced diameter. For front mounting, the bolt is directed through the handle slot and nut from the top surface, the bolt being threaded entirely through the captured nut such that the unthreaded, reduced diameter shank portion of the belt is embraced by the nut. The bolt is thus free to rotate within the nut, and may be aligned and inserted through the mating panel aperture. A second nut is then tightened on the projecting threaded portions behind the panel.

For rear panel mounting, the bolt is inserted through the panel aperture from the rear face of the panel into the handle slot for thread engagement with the captured nut. The bolt is then tightened in the conventional manner, it being dimensioned such that at full tightness its threaded section remain engaged with the nut. Once again, the nut may be positioned within the handle slot as required to align with the panel aperture. Thus, the handle assembly may be utilized in both front and rear mount configurations.

BRIEF DESCRIPTION OF THE DRAWINGS

A fuller understanding of the present invention will be reached upon consideration of the following detailed description of a preferred, but nonetheless illustrative embodiment thereof, when considered in conjunction with the annexed Figures, wherein:

FIG. 1 is an exploded elevation view of a handle assembly embodying the present invention, depicting both front and rear mount configurations;

FIG. 2 is a bottom plan view of the handle;

DETAILED DESCRIPTION OF A PREFERRED EMBODIMENT

Figure 3:
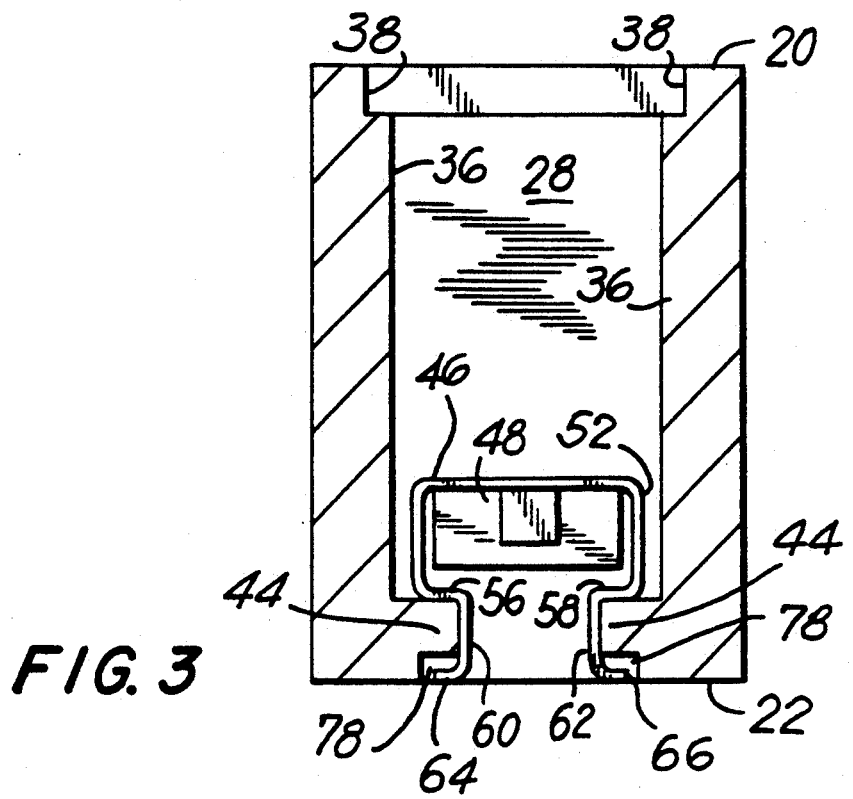
FIG. 3 is an end view in section of the handle, detailing the bolt-receiving aperture.

With reference to the Figures, FIG. 1 depicts a handle unit 10 of the present invention adapted to be mounted to a panel 12. The panel 12 is provided with one or more mounting holes 14 through which bolts 16, 18 extend to fasten the handle to the panel. The assembly of the present invention may be utilized to permit front mounting of the handle, in which the bolt 16 is inserted through the top or front surface 20 of the handle and exits through the rear or bottom surface 22, passes through the panel 12, and is secured by an appropriate nut 24. Rear mounting of the handle 10 is exemplified by the use of bolt 18, wherein the bolt first is inserted through the bore 14 in panel 12 from the rear of the panel, passing into the handle 10 from the rear surface 22 wherein it is retained in position by a nut mounted and captured within the interior of the handle.

While FIG. 1 depicts a handle being installed with a combination front and rear mount, it is to be appreciated that, in the normal course, either front or rear mounting will be utilized exclusively for a given handle assembly. Covers 26 are provided to close each of the apertures in the front surface of the handle to provide a finished appearance therefor.

With further reference to FIGS. 2 and 3, the handle 10 is provided with a pair of elongated apertures 28 extending between the front and rear surfaces 20, 22. As presented in the Figures, the handle 10 may be of any appropriate shape, having opposed mounting portions 30, 32 joined by a central hand-grip portion 34 whose lower surface may be contoured to allow a convenient handhold to be established. Each of the apertures 28 is of generally elongated, rectangular shape as seen in plan, permitting a bolt projecting therein to be aligned with a corresponding panel mounting hole 14. Each of the apertures 28 is provided with parallel sides 36, the upper extremity of the sides terminating in an outwardly-stepped ledge portion 38 adapted to accept the cover 26, as depicted in FIG. 1. The end walls of the aperture may be provided with opposed slots 40, adapted to receive the end tabs 42 on the cover 26 to retain the cover in position.

Figure 6:
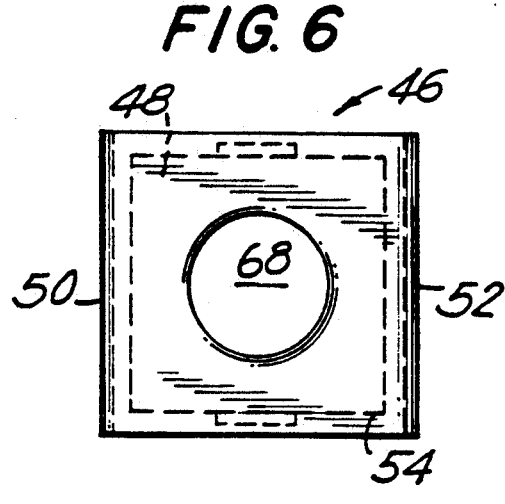
FIG. 6 is a top plan view of the cage for the retained nut of the invention.
Figure 7:
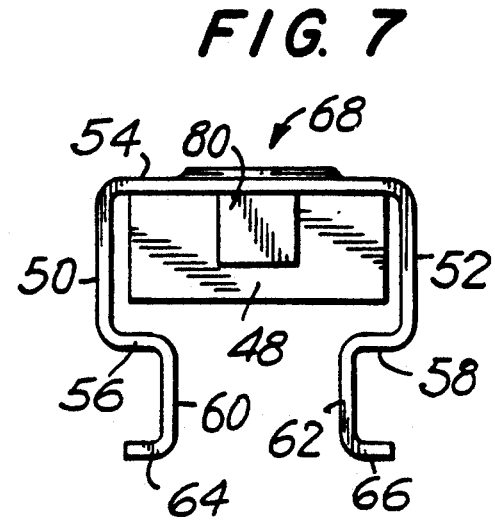
FIG. 7 is a side elevation view of the cage.

The lower portions of the side walls 36, proximate the bottom surface 22 of the handle but displaced slightly therefrom, are provided with a pair of inwardly-directed shoulders 44 along their length. The width of the aperture portion 78 below the shoulder, best seen in FIGS. 3-5, may be of the same or different from the width of the main portion of the aperture. Each pair of shoulders 44 provide a pair of rails for the mounting of a cage 46, which retains nut 48 within the aperture. As best seen in FIGS. 6 and 7, the cage 46 may be formed from a blank of sheet metal or the like, dimensioned to be bent to form an open-ended enclosure for the nut 48, with opposed sides 50 and 52, top wall 54, and bottom edge wall portions 56, 58.

Extending downwardly from the bottom edge wall portions are legs 60, 62, terminating in outwardly directed retainer portions 64, 66. Each U-shaped assembly developed by the respective bottom edge wall portion, leg and retainer-portion embraces and rides upon an aperture shoulder 44, the spacing between the legs allowing the shank of a bolt to pass therebetween. The shoulders 44 are displaced from the bottom surface 22 of the handle to provide the clearance 78 for the retainer portions.

Cage top wall 54 is provided with aperture 68 to permit access to the threaded aperture of the retained nut 48, while flanges 80, depending from top wall 68 about opposite sides of the nut, compensate with cage side walls 52 to maintain the nut in position. The cage bottom edge wall portions 56,58 prevent the nut from falling out the bottom of the cage. The cage and nut assembly can be snapped into position in the handle, permitting the nut to be maintained within the handle aperture 28 and positioned along the length thereof as necessary.

Mounting bolts 16, 18 are identical, are each adapted to interconnect with a nut 48, and are each provided with a threaded shank portion 70 and unthreaded shank portion 72 proximate the head 74 whose diameter is incrementally less than the thread diameter to provide clearance through the nut 48. The head 74 may be of conventional design, bearing a slot 76 configured for drive purposes as known in the art.

Figure 4:
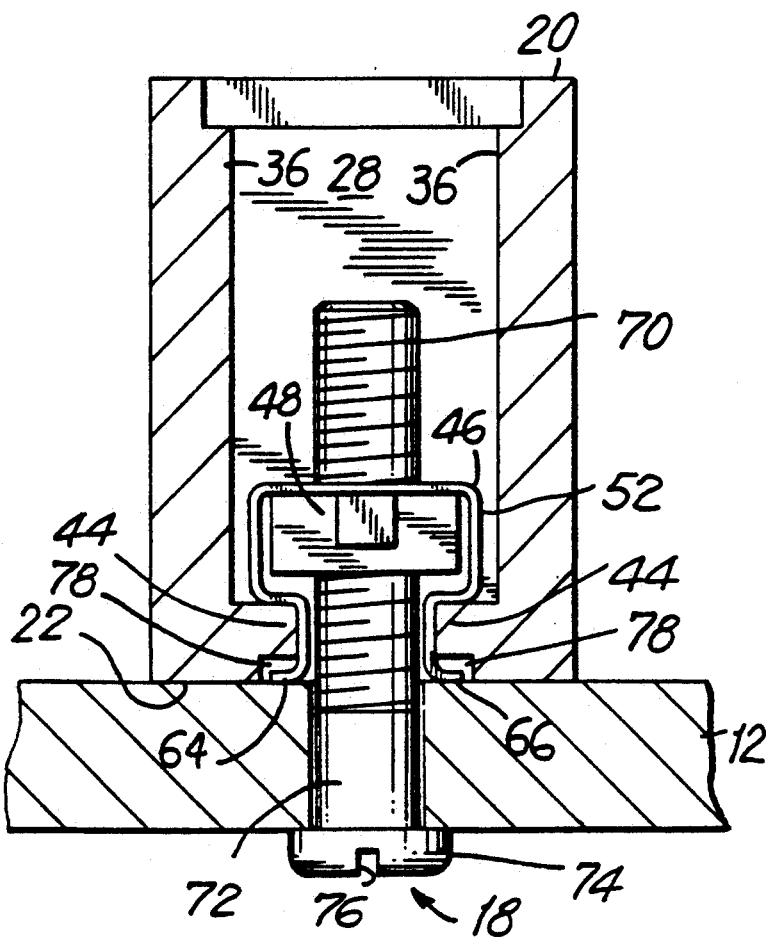
FIG. 4 is an end view in section of the handle detailing an installed rear mount.

As depicted in FIG. 4, rear mount of the handle 10 upon the panel 12 occurs by insertion of the bolt from the rear of the panel 12 and into the handle aperture through the handle bottom surface 22. The nut 48 in cage 46 may be slid along the length of the aperture as required to align with the bolt. The bolt then engages the nut in the conventional manner, the interlocking threads drawing the handle up tightly against the panel. Because the nut is retained in the cage, no slippage or rotation occurs during tightening.

Figure 5:
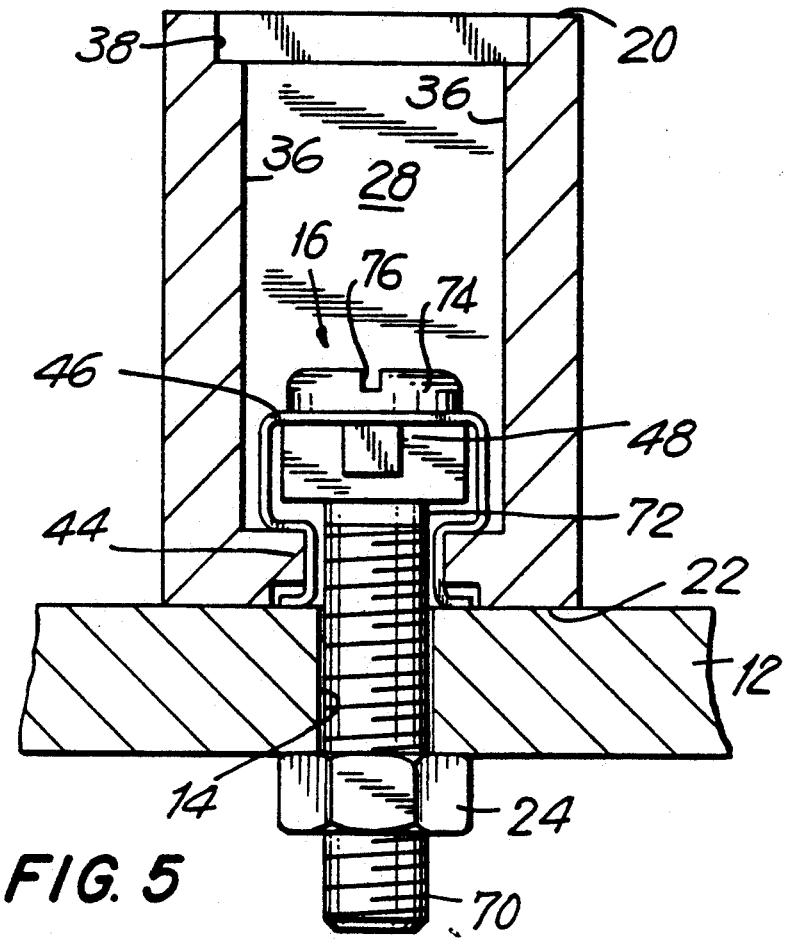
FIG. 5 is an end view in section of the handle detailing an installed front mount.

For front mounting of the handle, as depicted in FIG. 5, the bolt 16 is inserted into the appropriate handle aperture 28 through the top surface 20 of the handle to mate with the captured nut 48. The threads 70 engage the nut, the bolt being threaded down until the threaded portion passes entirely through the nut, the bolt being supported within the nut by the unthreaded shank portion 72 adjacent the head 74. Thus positioned, the bolt 18 is free to rotate within the nut, while being maintained within the handle by the nut and cage. With the threaded portion of the bolt now projecting outwardly from the handle through its bottom surface, the bolt is inserted into the appropriate bore 14 in the panel 12 and is maintained by a nut 76 threaded up against the back surface of the panel.

As disclosed herein, the assembly of the present invention thus provides for both front and rear mounting of a hardware item without the necessity for differing parts. It thus provides cost and efficiency savings not heretofore available.

I claim:

1. A new and improved panel mount hardware assembly, comprising a hardware body having front and rear faces, said rear face adapted to be placed in contact with a panel for mounting; at least one aperture in said hardware body extending between said front and rear faces; a nut mounted and retained within said aperture for threaded engagement with a bolt inserted into said aperture; and a bolt having a head and a shank, said shank having a threaded portion distal from said head for engagement with said nut and an unthreaded portion adjacent said head dimensioned to be freely engaged by said nut and accessed by said threads, said shank being of a length such that said threaded portion extends outwardly from said rear face of said hardware body for insertion through a panel while said unthreaded portion is freely engaged by said nut when said bolt is inserted through said aperture from said front face, and said threaded portion engages said nut when said bolt is inserted through a panel into said hardware body through the rear face thereof.

2. The hardware assembly of claim 1 further comprising a cage for mounting said nut, said cage being mounted within said aperture.

3. The hardware body of claim 2, wherein said hardware body comprises a pair of opposed rails forming a portion of the walls of said aperture, said rails adapted for the mounting of said cage thereon.

4. The hardware body of claim 3, wherein said rails are located proximate the rear face of said hardware body.

5. The hardware assembly of claim 1 further comprising a cover for at least one aperture, said hardware body having means for retaining said cover thereon.

* * * * *